United States Patent
Colenbrander

(10) Patent No.: US 11,083,963 B2
(45) Date of Patent: Aug. 10, 2021

(54) SAVE GAME LOAD TIME REDUCTION FOR CLOUD GAMING

(71) Applicant: Sony Computer Entertainment America LLC, San Mateo, CA (US)

(72) Inventor: Roderick Colenbrander, Aliso Viejo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 428 days.

(21) Appl. No.: 14/805,419

(22) Filed: Jul. 21, 2015

(65) Prior Publication Data

US 2016/0023109 A1 Jan. 28, 2016

Related U.S. Application Data

(60) Provisional application No. 62/027,747, filed on Jul. 22, 2014.

(51) Int. Cl.

| | |
|---|---|
| *A63F 13/355* | (2014.01) |
| *A63F 13/335* | (2014.01) |
| *A63F 13/49* | (2014.01) |
| *A63F 13/358* | (2014.01) |
| *A63F 13/352* | (2014.01) |
| *A63F 13/95* | (2014.01) |
| *A63F 9/24* | (2006.01) |

(52) U.S. Cl.
CPC .............. *A63F 13/355* (2014.09); *A63F 9/24* (2013.01); *A63F 13/335* (2014.09); *A63F 13/352* (2014.09); *A63F 13/358* (2014.09); *A63F 13/49* (2014.09); *A63F 13/95* (2014.09); *A63F 2009/2488* (2013.01); *A63F 2300/534* (2013.01); *A63F 2300/538* (2013.01); *A63F 2300/55* (2013.01); *A63F 2300/554* (2013.01); *A63F 2300/57* (2013.01)

(58) Field of Classification Search
CPC .... A63F 13/355; A63F 13/352; A63F 13/358; A63F 13/49; A63F 13/95; A63F 9/24
See application file for complete search history.

(56) References Cited

U.S. PATENT DOCUMENTS

| | | | |
|---|---|---|---|
| 2010/0167809 A1 | 7/2010 | Perlman et al. | ................. 463/24 |
| 2011/0126255 A1* | 5/2011 | Perlman | ................ A63F 13/355 |
| | | | 725/116 |

(Continued)

FOREIGN PATENT DOCUMENTS

| | | | | |
|---|---|---|---|---|
| EP | 2 745 893 A2 | 6/2014 | ........... | A63F 13/335 |

*Primary Examiner* — Yingchuan Zhang

(74) *Attorney, Agent, or Firm* — Penilla IP, APC

(57) ABSTRACT

A cloud gaming system having a game console that is configured to execute video games is provided. The game console provides an interface for a remote client device to interface with the game console and request that games be played. The game console being located in a first data center. The system further includes a storage server connected to the game console over a network connection in the first data center. A save data server is also provided and is located in a second data center. Data selection logic of the game console is provided. The data selection logic is configured to retrieve save data from the save data server and cache the save data to a save data disk of the game console. The data selection logic is configured to automatically retrieve the save data upon detecting a session initiation for a user account.

17 Claims, 4 Drawing Sheets

(56) References Cited

U.S. PATENT DOCUMENTS

| | | | |
|---|---|---|---|
| 2012/0278439 A1* | 11/2012 | Ahiska | H04L 67/2852 |
| | | | 709/218 |
| 2013/0084985 A1 | 4/2013 | Green et al. | 463/40 |
| 2013/0324245 A1* | 12/2013 | Harvey | A63F 13/49 |
| | | | 463/31 |
| 2015/0105154 A1 | 4/2015 | Green et al. | A63F 13/63 |
| 2015/0283462 A1* | 10/2015 | Chan | A63F 13/12 |
| | | | 709/203 |

* cited by examiner

Game console uses intermediate server for accessing storage ated data that may be used by the game logic to render a game or resume a game from where the user left off or to allow the user to resume from a next level or some other entry point.

SAVE GAME LOAD TIME REDUCTION FOR CLOUD GAMING

CLAIM OF PRIORITY

This application claims priority from U.S. Provisional Patent Application No. 62/027,747, filed Jul. 22, 2014, and entitled "SAVE GAME LOAD TIME REDUCTION FOR CLOUD GAMING," which is incorporated herein by reference.

BACKGROUND

1. Field of the Invention

The present invention relates to systems and methods for improving load times in online cloud gaming systems to improve user experience.

2. Description of the Related Art

One of the rapidly growing technologies is the field of cloud gaming. Users are able to access a number of games on a cloud gaming site over a network, such as the Internet, and begin interaction/playing the game. In order to select a game for game play, a user accesses his/her account on the cloud gaming site. The user is provided with a list of games that are available for the user account for game play. When the user selects a game for viewing and/or game play, the user will have to wait till the game code is loaded, graphics engines initialized, graphics are loaded, game and user settings are uploaded, etc., before he can access the game for game play, for example. The wait time for accessing and playing a select game may be longer for games that are graphic intensive. The wait time may also be associated to where certain game content is stored, such as its physical location in specific data centers. In some cases, game play saved data may be stored separately from game code, which leads to delays in retrieving saved data. The waiting may cause the user to lose interest in the game and to stop interacting with the game site, resulting in a potential loss to the game developer/game site owner.

It is within this context that embodiments of the invention arise.

SUMMARY

Embodiments are provided to enable dynamic caching of game play save data in anticipation that a user will need to access the save data. In one embodiment, the save data for player that logs into the game cloud system will be identified and retrieved from within a local data center or from a remote data center. In one configuration, priority to certain save data is calculated and updated. The priority includes determining a likelihood that the user will access the save data. In one embodiment, likelihood is determined from examination of the user's patterns of use and learning behaviors. The patterns of use may also be used to assign weightings to certain factors, such as how recently certain save data is accessed, when the save data is accessed, frequency of access, days and/or times of when save data is accessed, among other factors. Using this information, the cloud game system can determine the likelihood of certain saved data to be accessed and prioritizes the retrieval of the save data from other data centers to a local data center in which the game code is being or is about to be executed. In this manner, if the user decides to access save data, it is highly likely that the user's save data has already been locally cached, retrieved or is being retrieved.

Broadly speaking, save data is data related to a user's games or applications. The save data can include state date, progress data, scores achieved, levels reached, points earned, images saved, video clips posted, metadata regarding game play, social data related to game play and/or other contextually related data that may be used by the game logic to render a game or resume a game from where the user left off or to allow the user to resume from a next level or some other entry point.

A cloud gaming system is disclosed. The system includes a game console configured to execute game logic for one or more games and a storage server configured to store the one or more games. The game console is in network communication with the storage server. The storage server and the game console are located in a first data center. A save data server is in communication with the game console over an Internet connection. The save data server is located in a second data center. The save data server is configured to store save data associated with a game of the one or more games. The save data is usable by the game logic to render a current state of game play by a user accessing the cloud gaming system via a user account. The game console is configured automatically trigger retrieval of the save data from the second data center to the first data center for the user account upon detecting that a gaming session was initiated by a user via the user account. The retrieval acts to cache the save data so as to be accessible for use by the game console if the user selects the game. The retrieval and caching of the save data occurs while the game logic of the game is in process of loading.

In some embodiments, the save data for the game is selected for retrieval based on a likelihood that the game will be selected for play by the user.

In some embodiments, additional save data for other games are retrieved and cached upon the initiation of the gaming session, wherein each of the save data retrieved and cached is selected for retrieval based on a historical use pattern by the user associated with the user account.

In some embodiments the system also includes selecting additional save data for another game from a third data center upon the initiation of the gaming session, wherein each of the save data retrieved and cached is selected for retrieval based on a historical use pattern by the user associated with the user account.

In some embodiments, initiation of the gaming session includes logging into the cloud gaming system using the user account. The cloud gaming system identifies a plurality of games that the user has previously played, and each of the games that the user has previously played are enabled for selection for play. In one example, one or more of the games previously played has been played more than others or more recently than others.

In some embodiments, save data for more than one game is retrieved and cached based on a weighted priority that identifies games that are most likely to be played from the identified plurality of games, and the save data that is retrieved and saved will initially include at least those related to the games that the user is most likely to play.

In some embodiments, the game console is a cloud game console managed by the cloud gaming system, the game console is remote from a client device used to access the cloud gaming system.

In some embodiments, data selection logic for identifying save data that is to be retrieved is provided. The data selection logic generates a list of save data based on processing historical use by the user of certain games, the list of save data used in selecting which of the save data to retrieve and cache from the second data center or other data centers.

In some embodiments a streaming server is further provided and is configured to interface between the game console and the storage server and the save data server.

A cloud gaming system is disclosed. One example includes a game console that is configured to execute video games. The game console provides an interface for a remote client device to interface with the game console and request that games be played. The game console being located in a first data center. The system further includes a storage server connected to the game console over a network connection in the first data center. A save data server is also provided and is located in a second data center. A data selection logic of the game console is provided. The data selection logic is configured to retrieve save data from the save data server and cache the save data to a save data disk of the game console. The data selection logic is configured to automatically retrieve the save data upon detecting a session initiation for a user account associated with the remote client device. The data selection logic is configured to retrieve the save data that has a likelihood of being used during the session. In one example, the likelihood of being used is determined based on historical game play as associated with the user account.

In one embodiment a cloud gaming system including one or more game servers is provided. The one or more game servers is assignable to users of the cloud gaming system to enable access and play of online video games. The system includes examining, by the cloud gaming system, historical game play for a user account. The user account is used to access the cloud gaming system. The historical game play is examined to identify one or more save data and each save data is associated with a respective video game. The system also includes examining, by the cloud gaming system, timestamps of files associated with each save data. The system includes prioritizing, by the cloud game system, each of the save data. The save data that is used within a recent period of time is given an elevated weighting as compared to save data that has not been used within the recent period of time. The cloud gaming system received a request to access the game cloud system from the user account. The user account is associated with a plurality of games. The system assigns the user account to a first data center to enable access to one or more of the plurality of games. The system identifies the save data associated with the plurality of games for the user account. The system retrieves save data associated with one or more games from a second data center. The retrieving causes save data that has the elevated weighting to be cached to the first data center. Caching the save data having the elevated weighting to the first data center enables reducing loading times for games.

In some embodiments, the retrieving of save data is triggered upon receiving selection of one of the plurality of games.

In some embodiments, selection of one of the plurality of games causes creation of a game session.

In some embodiments, the retrieving is at least initiated or is active during creation of the game session, the creation of the game session includes loading game logic on at least one server of the first data center for streaming to a client device that accesses the cloud gaming system.

In some embodiments, two or more of the save data is cached to the first data center from one or more other data centers of the cloud gaming system in response to the user account being assigned to the first data center.

BRIEF DESCRIPTION OF THE DRAWINGS

The invention may best be understood by reference to the following description taken in conjunction with the accompanying drawings.

DETAILED DESCRIPTION

Figure 1:
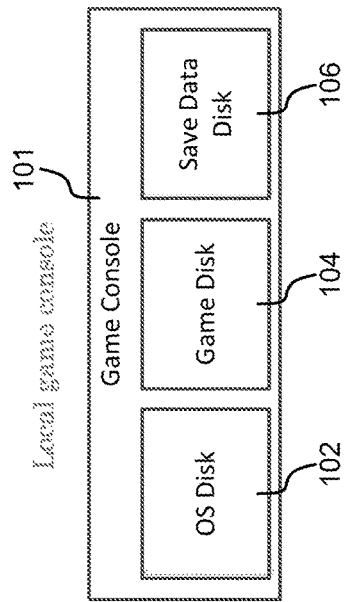
FIG. 1 illustrates a game console that may include specialized computer hardware for running video games.

Embodiments are described regarding systems, methods and apparatus for improving game performance in cloud gaming environments. In various examples described herein, performance is improved by using caching methods, wherein data that is likely to be accessed is cached to a local machine.

In example configuration, priority to certain save data is calculated and updated. The priority includes determining a likelihood that the user will access the save data. In one embodiment, likelihood is determined from examination of the user's patterns of use and learning behaviors. The patterns of use may also be used to assign weightings to certain factors, such as how recently certain save data is accessed, when the save data is accessed, frequency of access, days and/or times of when save data is accessed, among other factors. In one configuration, the weighting is dynamically adjusted over time. The adjusting can occur periodically or when certain use patterns dictate that the weighting is outdated or needs adjustment to be consistent with current patterns of use.

In one embodiment, data selection logic is processed by a streaming server, and this logic determines what data, files, blocks, or combinations thereof, shall be pre-cached. As described below in more detail, the data selection logic is used to retrieve save data from data centers that are local to a game console or in different data centers that are remote from where the game console is executing. The pre-caching therefore assists in making resuming of games with current game state or starting games shared by others with the game state that is appropriate, without waiting for retrieval or excess delay.

The embodiments described below therefore provide methods and systems to reduce load times for game saves, when a user, via a user account, runs a game on a cloud gaming service. Currently, the load times could be severely longer compared to a local console, due to transfer time of save data over the internet. When playing a game on a local console, both the game content and any save data is stored on the local console. Whenever a user wants to load a save game (e.g. from within a game menu), there is a wait time of a certain amount of time for the console to retrieve the save data from storage on his console (e.g. a hard drive, memory card, etc.). In a case of cloud gaming services, games run on 'server' game consoles in data centers all around the world. The game content and save data are not stored directly on the 'server' game console, but elsewhere on storage servers.

Thus, game content is stored within the same data center as the game server is located, but save data is not guaranteed to be in the same data center, but is likely to be stored at a data center that may be on the other side of the country or even other side of the world. The challenge is that whenever a user wants to load a 'save game' (from a menu inside a game), his save data has to come from elsewhere across the internet (e.g., remote data center). The delay of 'cloud save data' versus a local console, is a function of the size of the save data and the network connection (bandwidth+latency) between 'server game console' and save storage server. Depending on the data access pattern of a game, the 'internet delay' may cause significantly longer load times of save games.

In one embodiment, a method of predicting what save game data the user is going to load and pre-load (cache) is provided, such as before the user requests to load the save data from the game menu. In one embodiment, it is known what game a user is going to play, so it is possible to guess that the user is going to continue where he stopped playing the last time. Based on information from the previous accesses or timestamps on files, an embodiment is provided to pre-load parts of save data.

In one implementation, the pre-load of save data is configured to happen during 'creation of a game session'. For some cloud gaming technologies, an amount of time is required to initialize a cloud gaming session and to start a game. For example, the time to initialize the session may be e.g., '10 seconds' and for a given game it may then take e.g., '30 seconds' to reach a game menu from which a save game can be loaded. During the time when the game is starting up, the server machine which manages the local console, can pre-cache the save data. Thus, if the user happens to load this save data later on (which he is very likely to do), there would be no penalty for retrieving the save data across the internet.

For providing additional context of several of the disclosed embodiments, an overview is provided regarding storage in the context of a local game console, followed by examples of possible cloud gaming storage implementations.

As shown in FIG. 1, a game console 101 may include specialized computer hardware for running video games. The video game content, the console's operating system (OS) 102 and any save data are stored on one or more types of storage media, e.g., save data disk 106. In general, it depends on the exact hardware configuration to determine what media is used. For example, a game console 101 may include a hard disk or flash drive for the OS 102 and save data 106, while the game 104 is stored on either an optical medium (CD-ROM, DVD-ROM or BD-ROM) or on the hard drive for a downloadable game. In other consoles, the OS 102 may have been stored in a ROM and save data on special memory cards.

Figure 2:
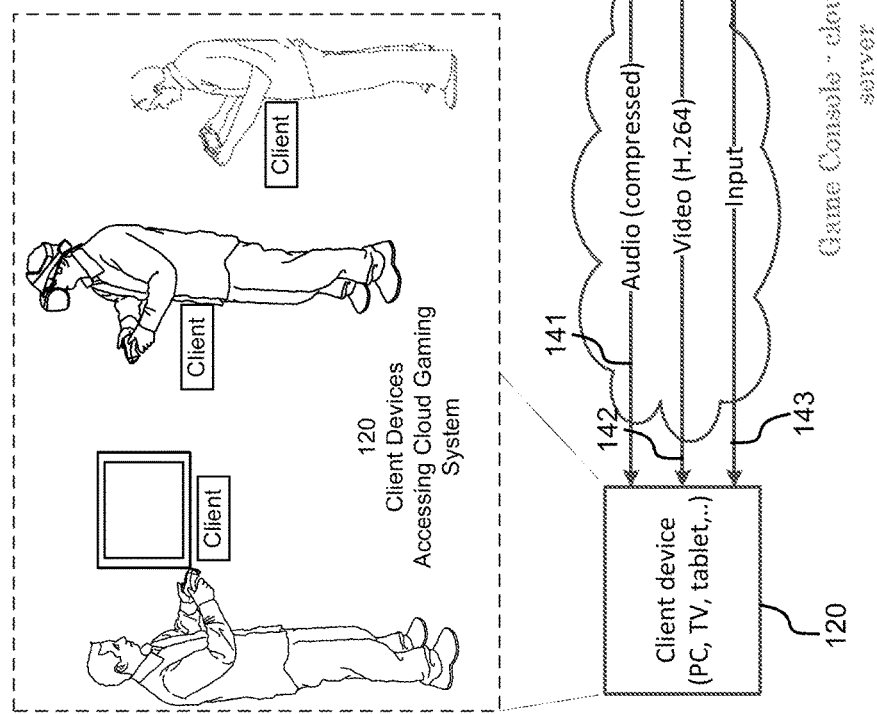
FIG. 2 shows an example game console used for cloud gaming via a streaming server, in accordance with one embodiment.

FIG. 2 shows an example of a cloud game system. In a cloud gaming system, a game console 130 (or hardware and/or software that emulates or defines the game console) may be located in a data center 150 far away from the user that is interfacing with a client device 120. The audio and video of the game is streamed over the internet to a client device 120, giving the user the illusion that play is via a local console. The game console 130 is, in this configuration, a cloud game console as it is remote from the user device 120, and it is managed by a cloud gaming system. As noted, the game console 130 may be implemented on a server in a data center, but in one configuration, the server has specialized hardware that emulates the game console 130.

This example shows a client device 120, which is a remote device. The remote device can be any type of device having a decoder capable of decoding an encoded video stream 142, e.g., one encoded using video standard H.264 or similar. Just for example, the client device may be a local game console, a television, a tablet computer, a smartphone, a personal computer (PC), etc. In one configuration, the audio 141 may also be compressed separately and communicated by the streaming server 124 to the client. Input 143 is received from the client device. The input 143 can be any type of control information, such as button clicks using a controller, motion data provided from a controller having an inertial sensor(s), gesture data, camera data input (i.e., detected using a local camera), mouse inputs, mouse clicks, touch pad inputs, and head mounted display input or sensed positioning, etc. The type of input will depend upon the type of game being played and the inputs expected or receivable by the game executed by the server of the cloud gaming system.

In one embodiment, the streaming server 124 of FIG. 2 is configured to handle streaming operations, such as receiving connection requests from user accounts, assigning user accounts to specific data centers, load balancing of users accounts to data centers, testing connections between clients and the server, maintaining quality of service and adjusting compression encoding to maintain streaming service at an acceptable level when changes in connection speed are detected or other network, systems or device operations impact throughput or quality.

In one embodiment, a data center 150 may contain multiple game consoles or servers, which are shared among users. In some configurations, each game console 130 serves one user, but when that user is gone or is done playing, the machine is available for another user. In other embodiments, one game console 130 can serve multiple users or a set number. As used herein, a game console 130 may be a specialized computer. The specialized computer may be configured as a traditional home game console or may defined in the form of a server. The computer is specialized as the logic and hardware of the server is designed to handle execution of computer games that are designed to efficiently operate with and efficiently interact with the hardware and/or logic. If the game console is defined in the form of a server, the server may arranged in storage racks, which are typically defined by stacks of server blades, shared ventilation, and in some cases, shared power supplies. In one configuration, data centers may include a plurality of servers. The servers may define a game console, for example.

Figure 3:
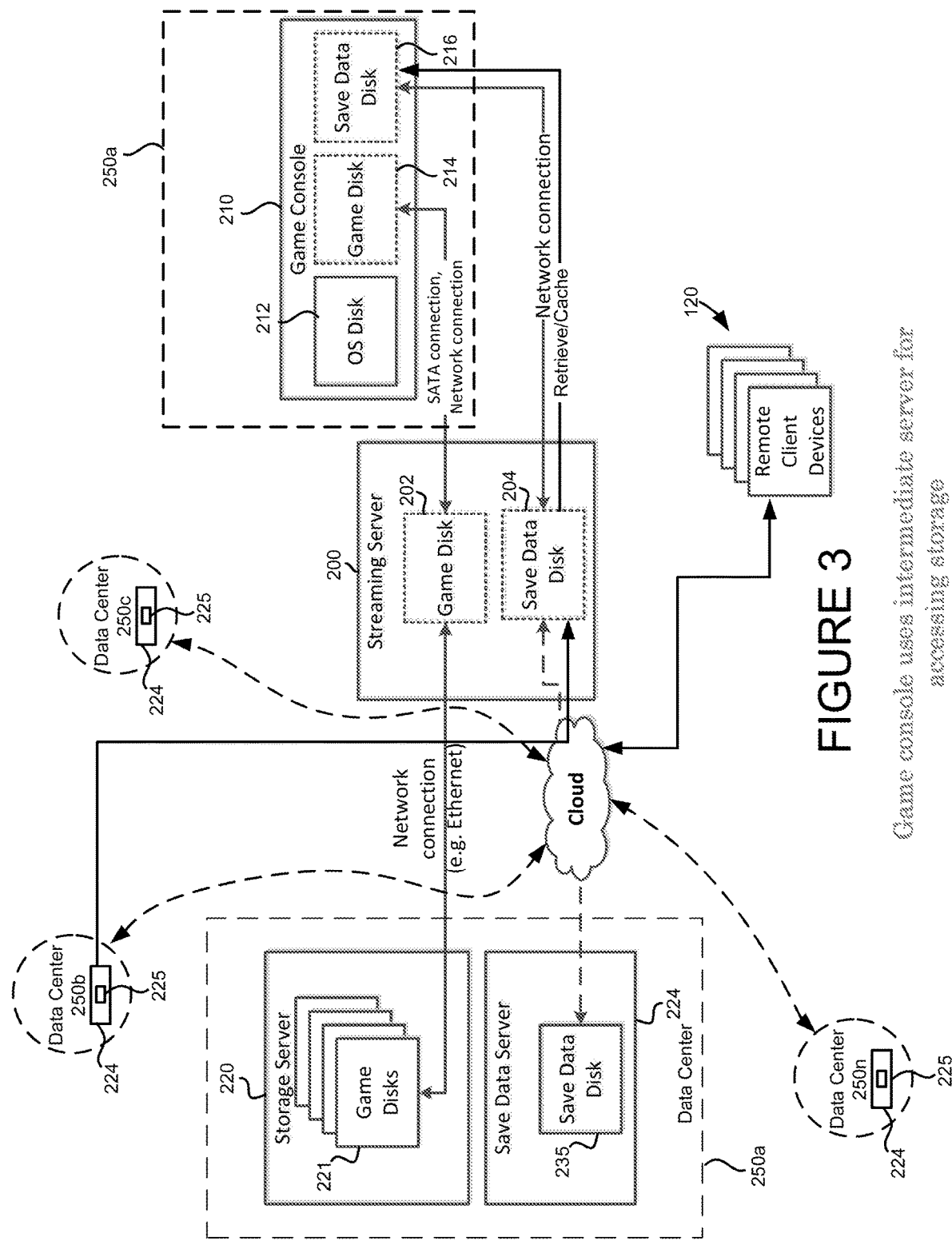
FIG. 3 illustrates an example game console that uses an intermediate server for accessing storage.

FIG. 3 illustrates an example showing a streaming server 200 that may be in communication with multiple data centers 250a-250n. In a data center example, a different storage setup is used. Instead of local storage, game disks 225 (and optionally the OS) are stored on a storage server 220. In one embodiment, for performance (bandwidth and latency) the storage server 220 is located in a same data center as the game console 210. As shown, the game console 210 is located in data center 250a and so is storage server 220 that has game disks 221. The game console 210 accesses the storage server 220 directly or it goes through an intermediate server, e.g., streaming server 200, via game disk 202

In one implementation, a user's save data is also stored on a type of storage server named 'Save Data Server' 224, which has save data disk 225. This server 224 may or may not be located in the same data center as the game console the user is playing or accessing for remote play/cloud gaming. Further, in some configurations, not all data centers are required to have Save Data Servers 224. As such, a user is not guaranteed to play on a console 210 from the same data center. In one configuration, for improving system performance, a data center is assigned to a user (i.e., user account) based on availability and ping-time. In such configurations, this means that data may again be in a different data center. For example, it is possible that the game console 210 is in data center 250*a*, while the save data server 225 that holds the save data disk 225 is in data center 250*b*. For example, if the user is desiring to play a game that is executing in game disks 221 of game server 220 and game console 210 (i.e., in data center 250*a*), the user's save data for that game may be located in data center 250*b*, having save data server 224 and save disk 225.

The save data, in general, not stored in the same physical location as the game console 210 running a game, causes challenges. One challenge has to do with access times and performance for accessing the 'cloud save data', stored by save data servers 224 in save data disks 225. In some embodiments, unmodified games designed for a local console are used on cloud gaming machines. These games are designed with local storage (e.g. a hard drive) having certain performance characteristics in mind Mismatches in performance characteristics, affect game loading and saving time. In some cases, a game may even crash, because it made assumptions about timing and performance.

As an example, the save data for a game may be 10 MB in size. On a hard disk with a throughput of 80 MB/s and a disk seek time of 20 ms, it would take 20 ms+10 MB/80 MB/s=125 ms to access this data (it would be copied to RAM on the game console). Small reads (a few kB) would roughly equal the disk seek time, so 20 ms.

However, the same example for cloud gaming configurations will have very different results. For example, there is a certain 'latency' due to the network connection between the data centers 250. This may be 50 ms (round-trip) or even more depending on how far the data centers are located apart. There is also a certain network bandwidth, for example 100 MB/s. In this case the access time as seen by the console would be: 125 ms+50 ms+10 MB/100 MB/s=275 ms. If the network were to become busier, the round-trip is likely to go up and the bandwidth would drop e.g. to 10 MB/s. Small reads (a few kB), may now take 20 ms (seek time)+50 ms network=70 ms.

Thus, it depends on the game architecture on how it is affected by these problems. If a game reads all data at once, it sees the cloud delay only once. If the game performs a large amount of small reads, it sees the network delay more often. In various embodiments defined herein, methods for caching and reading data ahead are described, which address the above noted latency issues in cloud gaming environments.

Examples are herein provided regarding block level (or buffer) caching by an operating system. For applications it is very common to access the same data multiple times in a row within a short time. The function of caching is to keep a copy of the data around in a faster type of memory (e.g. system RAM) in order to hide 'poor performance' of a slow medium, e.g., such as a hard drive. This can improve access times by orders of magnitude and is useful to achieve higher performance.

On storage media, files are stored in 'blocks' by a file system. Whenever a file 'read' request is received by an operating system (OS), the OS checks if it already has a 'copy of this block' in the cache. If it has it returns this copy, or else the OS will read the data from the storage medium and at the same time store the data in cache.

For a 'write' request, there is caching as well. An OS can decide to write the data to the cache and write it immediately to the storage medium as well ('write-through') or it can do it at a later time ('write-back'). The later mechanism is less useful, because data may not get written to the storage medium e.g. in case of a system crash before the OS wrote data to the disk.

Further caching is often combined with read-ahead mechanisms. In one embodiment, if you access block 'X', it is very likely you are to read block 'X+1' as well and maybe more adjacent blocks. In one implementation, the OS may be programmed to transfer these in addition to block X, when a transfer of block X is requested.

In one configuration, the size of the block cache is variable and may be as much as 'all of the system RAM' not currently used by applications. If applications need more memory, the cache becomes smaller and the oldest pages get removed.

With the above in mind, several implementations are additionally provided below. As noted above, there is a performance challenge related to access of save data in a cloud gaming environment. Methods like block caching and read-ahead can help improve performance, at the time a process wants to access certain data. For block caching, there is a performance delay due to blocks not being cached. For read-ahead caching, the OS may only make conservative read-ahead decisions (e.g. only read a few future blocks), because it cannot predict well what the process wants to access.

One implementation example provides methods for filling the block cache with save data, before the game requests the data. Filling of the cache would take place during 'session preparation' and 'game startup'.

For example, various actions take place behind the scenes, whenever a user initiates a cloud gaming session. The first step is an internet connection check in which the ping-time and bandwidth to several nearby data centers is checked. If the connection quality is adequate, the best data center 250 is picked for this user (based on, for example, lowest ping and highest bandwidth). Then the user is assigned a specific streaming server 200 and game console 210. The streaming server 200 is then contacted to prepare a cloud gaming session for this user, whom logged in via a user account.

During preparation, the streaming technology is initialized, a game disk 221 is mounted from the storage server 220 and any cloud save data from a save data disk 225 is mounted from a save data server 224. Once this example preparation work is done (e.g., may take 5 seconds or so), the game is started on the remote game console 210 (e.g., cloud system) and at this point also the streaming server 200 starts streaming audio 141 and video 142 frames. For the typical game it takes about 15 seconds or more to reach the game menu. It should be understood that these are just example times, and the actual time will vary.

Figure 4:
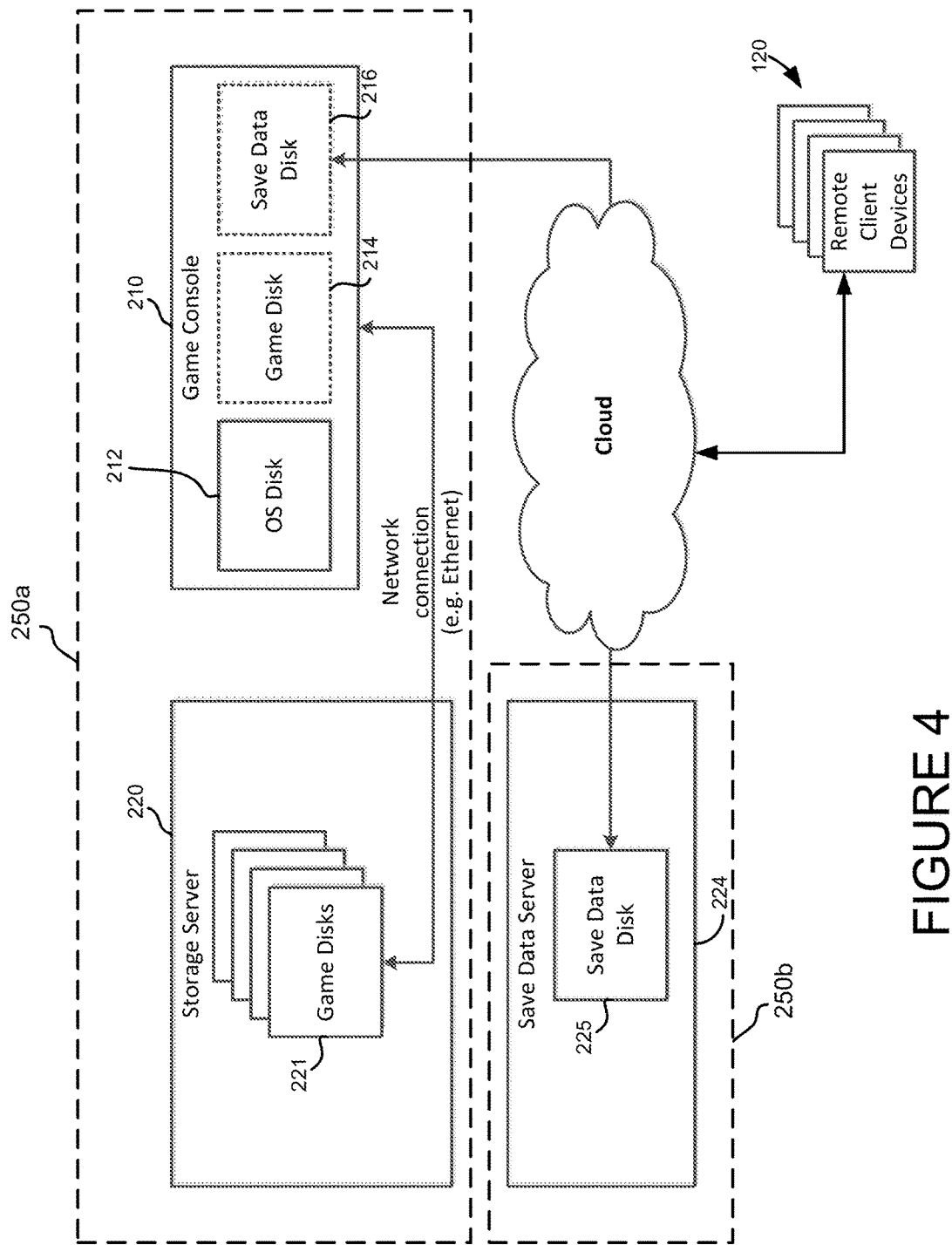
FIG. 4 shows an example cloud game system that directly talks to storage servers, in accordance with one embodiment.

FIG. 4 illustrates an example where the game console 210 will directly communication with the storage server 220. In this configuration, the save data disk 225 may be in a save data server that is in the same data center 250*a* as the game console 210 or in a remote data center 250*b-n*. No matter where the save data is located, the system during a retrieval and caching process, will reach out to the data centers and retrieve the save data and return it to the save data disk 216 of the game console 216. In some configurations, if the user does not access the save data after a period of time and other save data becomes more likely to be used, save data retrieved to the game console 210 can be refreshed. That is, save data in the save data disk 216 can be deleted or overwritten with data that is more likely to be used. This may happen if the user does not resume playing a game for a long time or the user gives up and never returns to the game. In these cases, that data over time can be identified as stale and can be omitted from being retrieved and cached to the save data disk 216 or removed from the save data disk 216.

In one implementation, after mounting cloud storage (i.e., game disk 221) and during game startup, the streaming server 200 which manages the console 210, can pre-cache the save data which is obtained from either the same save data server 224 located on the same data center 250a as the game console 210 or located on a different save data server 224 located on a different data center 250b-n. This process, in one embodiment, is processed by reading save data files from a data disk 225, which would then get loaded into the system's block cache of the game console 210. As shown in FIG. 3, save data is retrieved and cached from data center 250b directly to the save data disk 216 of the game console 210. Also shown is that the game disk is retrieved from the local storage server 220 and mounted as game disk 214 on the game console 210. The OS disk 212 is also operating in the game console 210. In one embodiment, the save data may be for certain games or applications that the user has a likelihood of playing. Thus, if the user happens to load this save data later on (which he is very likely to do), there would be no penalty for retrieving the save data across the internet. That is, because the save data is retrieved during initiation of the game session, e.g., while mounting the game disk, the save data, even if present in remote data centers, will be present or almost all present when the user decides to access the game.

As noted above, decisions are made as to what files to pre-cache (i.e., retrieve from local or remote data centers). Data selection logic is used to make decisions as to what data is to be retrieved and cached. In one embodiment, the data selection logic can process rules and construct rules over time based on user patterns, changes in patterns, etc. In one example, one rule is that it is very likely that the user is going to resume where he left of the last session for that game. The last save game, can for example be found by looking at timestamps on files (e.g., when was the file last modified). The streaming server, in one embodiment, can mark in a configuration file stored with the save data, what files were accessed last. Depending on the size of the save data, some or all of the data can get pre-cached if there is enough RAM.

In some game console configurations, consoles can save games that are typically several megabytes in size or larger. In still other console configurations, save games may be significantly bigger in the hundreds of MB range or larger. For these cases, selection of portions to cache can utilize additional rules, including prediction algorithms. Prediction algorithms may include, determining access patterns for particular games or by particular users. Estimation of what data is most accessed can also be made using historical data of each user or based on historical access patterns by other users or users of similar skill. The access patterns may also depend on the game level and experience and how often a user plays or access a game in a cloud gaming system.

It should be understood that the various embodiments described herein may be combined to define different implementations, and in other cases elements or features may be omitted to define new implementations. The intelligent retrieval and caching of save data is therefore understood to broadly embody various modifications so long as the functionality of caching is maintained. Caching, as described herein means that save data will be retrieved from a storage server, and the storage server may be in a local data center or a remote data center. During loading of a game, the system will identify which save data to retrieve and identify its data center location. The server will then retrieve and store the selected save data to the game console save data disk. This will enable the game console 210 to quickly start a game with the most recent save data, without having to wait to separately retrieve the save data after the game is loaded. Thus, the save data is considered cached, as the data may or may not be used, but it is local and ready to be used in an efficient manner if the user decides to use the save data, e.g., decides to start a game or application that needs that save data.

Figure 5:
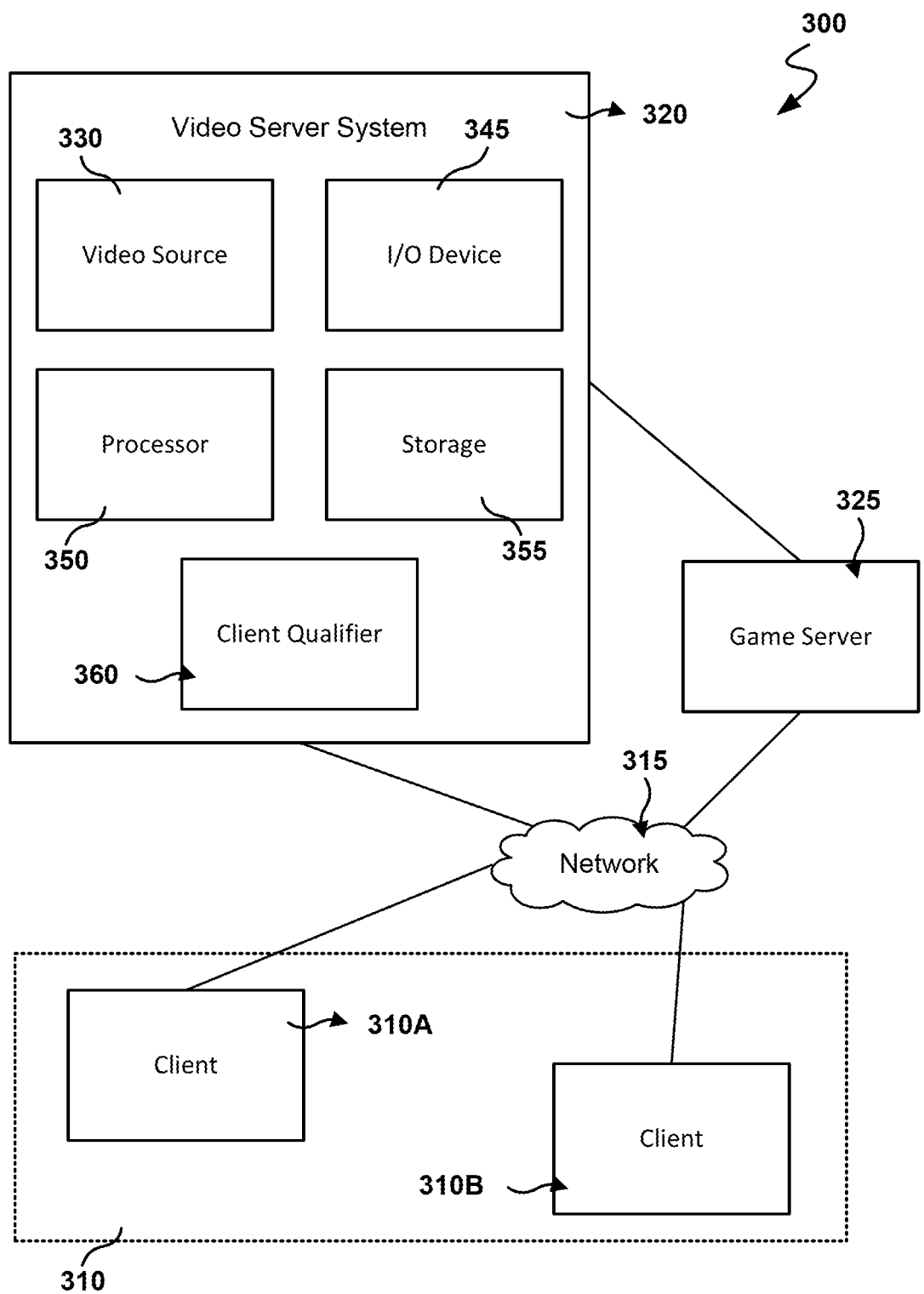
FIG. 5 is a block diagram of a Game System, according to various embodiments of the invention

FIG. 5 is a block diagram of a Game System 300, according to various embodiments of the invention. It should be noted that the Game System is exemplary and other types of systems may also use the enhanced optical system defined in the HMD for presenting content/real-world objects. Game System 1100 is configured to provide a video stream to one or more Clients 310 via a Network 315. Game System 300 typically includes a Video Server System 320 and an optional game server 325. Video Server System 320 is configured to provide the video stream to the one or more Clients 310 with a minimal quality of service. For example, Video Server System 320 may receive a game command that changes the state of or a point of view within a video game, and provide Clients 310 with an updated video stream reflecting this change in state with minimal lag time. The Video Server System 320 may be configured to provide the video stream in a wide variety of alternative video formats.

Clients 310, referred to herein individually as 310A, 310B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 310 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 310, such as a display screen of a HMD device, or on a separate device such as a monitor or television. Clients 310 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 310 are optionally geographically dispersed. The number of clients included in Game System 300 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 320 to deliver a game viewed through the HMD. In one embodiment, the game console receives the video stream from the video server system 320, and the game console forwards the video stream, or updates to the video stream, to the HMD for rendering.

Clients 310 are configured to receive video streams via Network 315. Network 315 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 310 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 310 may, but are not required to, further include systems configured for modifying received video. For example, a client may be configured to perform further rendering, to overlay one video image on another video image, to crop a video image, and/or the like. For example, Clients 310 may be configured to receive various types of video frames, such as I-frames, P-frames and B-frames, and to process these frames into images for display to a user. In some embodiments, a member of Clients 310 is configured to perform further rendering, shading, conversion to 3-D, optical distortion processing for HMD optics, or like operations on the video stream. A member of Clients 310 is optionally configured to receive more than one audio or video stream. Input devices of Clients 310 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 310 is generated and provided by Video Server System 320. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 310 are typically configured to receive inputs from a user. These inputs may include game commands configured to change the state of the video game or otherwise affect game play. The game commands can be received using input devices and/or may be automatically generated by computing instructions executing on Clients 310. The received game commands are communicated from Clients 310 via Network 315 to Video Server System 320 and/or Game Server 325. For example, in some embodiments, the game commands are communicated to Game Server 325 via Video Server System 320. In some embodiments, separate copies of the game commands are communicated from Clients 310 to Game Server 325 and Video Server System 320. The communication of game commands is optionally dependent on the identity of the command. Game commands are optionally communicated from Client 310A through a different route or communication channel that that used to provide audio or video streams to Client 310A.

Game Server 325 is optionally operated by a different entity than Video Server System 320. For example, Game Server 325 may be operated by the publisher of a multiplayer game. In this example, Video Server System 320 is optionally viewed as a client by Game Server 325 and optionally configured to appear from the point of view of Game Server 325 to be a prior art client executing a prior art game engine. Communication between Video Server System 320 and Game Server 325 optionally occurs via Network 315. As such, Game Server 325 can be a prior art multiplayer game server that sends game state information to multiple clients, one of which is game server system 320. Video Server System 320 may be configured to communicate with multiple instances of Game Server 325 at the same time. For example, Video Server System 320 can be configured to provide a plurality of different video games to different users. Each of these different video games may be supported by a different Game Server 325 and/or published by different entities. In some embodiments, several geographically distributed instances of Video Server System 320 are configured to provide game video to a plurality of different users. Each of these instances of Video Server System 320 may be in communication with the same instance of Game Server 325. Communication between Video Server System 320 and one or more Game Server 325 optionally occurs via a dedicated communication channel. For example, Video Server System 320 may be connected to Game Server 325 via a high bandwidth channel that is dedicated to communication between these two systems.

Video Server System 320 comprises at least a Video Source 330, an I/O Device 345, a Processor 350, and non-transitory Storage 355. Video Server System 320 may include one computing device or be distributed among a plurality of computing devices. These computing devices are optionally connected via a communications system such as a local area network.

Video Source 330 is configured to provide a video stream, e.g., streaming video or a series of video frames that form a moving picture. In some embodiments, Video Source 330 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 325. Game Server 325 may maintain a copy of the state of the game based on game commands received from multiple players using geographically disperse clients. In these cases, the game state is provided by Game Server 325 to Video Source 330, wherein a copy of the game state is stored and rendering is performed. Game Server 325 may receive game commands directly from Clients 310 via Network 315, and/or may receive game commands via Video Server System 320.

Video Source 330 typically includes rendering logic, e.g., hardware, firmware, and/or software stored on a computer readable medium such as Storage 355. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 310. For example, the raw video may be encoded according to an Adobe Flash® standard, .wav, H.26x, H.265, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 330 includes a video recording device such as a camera. This camera may be used to generate delayed or live video that can be included in the video stream of a computer game. The resulting video stream, optionally includes both rendered images and images recorded using a still or video camera. Video Source 330 may also include storage devices configured to store previously recorded video to be included in a video stream. Video Source 330 may also include motion or positioning sensing devices configured to detect motion or position of an object, e.g., person, and logic configured to determine a game state or produce video-based on the detected motion and/or position.

Video Source 330 is optionally configured to provide overlays configured to be placed on other video. For example, these overlays may include a command interface, log in instructions, messages to a game player, images of other game players, video feeds of other game players (e.g., webcam video). In embodiments of Client 310A including a touch screen interface or a gaze detection interface, the overlay may include a virtual keyboard, joystick, touch pad, and/or the like. In one example of an overlay a player's voice is overlaid on an audio stream. Video Source 330 optionally further includes one or more audio sources.

In embodiments wherein Video Server System 320 is configured to maintain the game state based on input from more than one player, each player may have a different point of view comprising a position and direction of view. Video Source 330 is optionally configured to provide a separate video stream for each player based on their point of view. Further, Video Source 330 may be configured to provide a different frame size, frame data size, and/or encoding to each of Client 310. Video Source 330 is optionally configured to provide 3-D video.

I/O Device 345 is configured for Video Server System 320 to send and/or receive information such as video, commands, requests for information, a game state, gaze information, device motion, device location, user motion, client identities, player identities, game commands, security information, audio, and/or the like. I/O Device 345 typically includes communication hardware such as a network card or modem. I/O Device 345 is configured to communicate with Game Server 325, Network 315, and/or Clients 310.

Processor 350 is configured to execute logic, e.g. software, included within the various components of Video Server System 320 discussed herein. For example, Processor 350 may be programmed with software instructions in order to perform the functions of Video Source 330, Game Server 325, and/or a Client Qualifier 360. Video Server System 320 optionally includes more than one instance of Processor 350. Processor 350 may also be programmed with software instructions in order to execute commands received by Video Server System 320, or to coordinate the operation of the various elements of Game System 300 discussed herein. Processor 350 may include one or more hardware device. Processor 350 is an electronic processor.

Storage 355 includes non-transitory analog and/or digital storage devices. For example, Storage 355 may include an analog storage device configured to store video frames. Storage 355 may include a computer readable digital storage, e.g. a hard drive, an optical drive, or solid state storage. Storage 315 is configured (e.g. by way of an appropriate data structure or file system) to store video frames, artificial frames, a video stream including both video frames and artificial frames, audio frame, an audio stream, and/or the like. Storage 355 is optionally distributed among a plurality of devices. In some embodiments, Storage 355 is configured to store the software components of Video Source 330 discussed elsewhere herein. These components may be stored in a format ready to be provisioned when needed.

Video Server System 320 optionally further comprises Client Qualifier 360. Client Qualifier 360 is configured for remotely determining the capabilities of a client, such as Clients 310A or 310B. These capabilities can include both the capabilities of Client 310A itself as well as the capabilities of one or more communication channels between Client 310A and Video Server System 320. For example, Client Qualifier 360 may be configured to test a communication channel through Network 315.

Client Qualifier 360 can determine (e.g., discover) the capabilities of Client 310A manually or automatically. Manual determination includes communicating with a user of Client 310A and asking the user to provide capabilities. For example, in some embodiments, Client Qualifier 360 is configured to display images, text, and/or the like within a browser of Client 310A. In one embodiment, Client 310A is an HMD that includes a browser. In another embodiment, client 310A is a game console having a browser, which may be displayed on the HMD. The displayed objects request that the user enter information such as operating system, processor, video decoder type, type of network connection, display resolution, etc. of Client 310A. The information entered by the user is communicated back to Client Qualifier 360.

Automatic determination may occur, for example, by execution of an agent on Client 310A and/or by sending test video to Client 310A. The agent may comprise computing instructions, such as java script, embedded in a web page or installed as an add-on. The agent is optionally provided by Client Qualifier 360. In various embodiments, the agent can find out processing power of Client 310A, decoding and display capabilities of Client 310A, lag time reliability and bandwidth of communication channels between Client 310A and Video Server System 320, a display type of Client 310A, firewalls present on Client 310A, hardware of Client 310A, software executing on Client 310A, registry entries within Client 310A, and/or the like.

Client Qualifier 360 includes hardware, firmware, and/or software stored on a computer readable medium. Client Qualifier 360 is optionally disposed on a computing device separate from one or more other elements of Video Server System 320. For example, in some embodiments, Client Qualifier 360 is configured to determine the characteristics of communication channels between Clients 310 and more than one instance of Video Server System 320. In these embodiments the information discovered by Client Qualifier can be used to determine which instance of Video Server System 320 is best suited for delivery of streaming video to one of Clients 310.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the disclosure. Accordingly, the present embodiments are to be considered as illustrative and not restrictive, and the invention is not to be limited to the details given herein, but may be modified within the scope and equivalents of the claims.

The invention claimed is:

1. A cloud gaming system, comprising,
   a game console configured to execute game logic for one or more games, the game console being installed at a first data center of the cloud gaming system;
   a storage server configured to store the one or more games, the game console being in network communication with the storage server, the storage server and the game console being located in the first data center, the storage server storing game disks that represent the game logic for each of the one or more games; and
   a save data server, the save data server being in communication with the game console over an Internet connection, wherein the save data server is located in a second data center;
   wherein the game console is configured to obtain one or more of said game disks for executing the game logic of said one or more games responsive to receiving a request from a user to access the cloud gaming system via a user account that causes a gaming session to be initiated;
   wherein the save data server is configured to store save data separately from said game disks of the one or more games, the save data is usable by the game logic to render a current state of game play by the user accessing the cloud gaming system, the current state of game play represents activity achieved during play and is associated with the user account for said one or more games,
   the game console is configured to automatically trigger retrieval of save data for specific ones of said one or more games from the second data center to the first data center for the user account,
   the retrieval of save data from the second data center causing the save data to be cached at the first data center so that the save data is accessible for use by the game console at the first data center, and the automatic trigger of retrieval of the save data is based on a prediction that the user will select to resume play of specific ones of said games at the current state of game play using said save data that has been cached,
   wherein the retrieval and caching of the save data starts responsive to and upon initiation of the game session and before the game is selected and loaded for play, and once the game logic of the game is selected and loaded for play, the game logic uses the cached save data for the game of the user, the game console is configured to execute the game logic and stream video frames to a remote client of the user without sending game logic or save data to the remote client.

2. The cloud gaming system of claim 1, wherein the prediction that the user will select to resume play of one of said games is at least partially based on a likelihood that the game will be selected for play by the user.

3. The cloud gaming system of claim 1, wherein additional save data for other games are retrieved and cached upon the initiation of the gaming session, wherein each of the save data retrieved and cached is selected for retrieval is additionally based on a historical use pattern by the user associated with the user account.

4. The cloud gaming system of claim 1, further comprising,
   selecting an additional save data for another game from a third data center upon the initiation of the gaming session, wherein each of the save data retrieved and cached is selected for retrieval is additionally based on a historical use pattern by the user associated with the user account.

5. The cloud gaming system of claim 1, wherein initiation of the gaming session includes logging into the cloud gaming system using the user account, wherein the cloud gaming system identifies a plurality of games that the user has previously played, each of the games that the user has previously played are enabled for selection for play, wherein one or more of the games previously played has been played more than others or more recently than others.

6. The cloud gaming system of claim 5, wherein save data for more than one game is retrieved and cached additionally based on a weighted priority that identifies games that most likely to be played from the identified plurality of games, and the save data that is retrieved and saved will initially include at least those related to the games that the user is most likely to play.

7. The cloud gaming system of claim 1, wherein the game console is a cloud game console managed by the cloud gaming system, the game console is remote from the remote client device used to access the cloud gaming system.

8. The cloud gaming system of claim 1, further comprising,
data selection logic for identifying save data that is to be retrieved, the data selection logic generates a list of save data based on processing historical use by the user of certain games, the list of save data used in selecting which of the save data to retrieve and cache from the second data center or other data centers.

9. The cloud gaming system of claim 1, further comprising,
a streaming server configured to interface between the game console and the storage server and the save data server.

10. A cloud gaming system, comprising,
a streaming server configured to manage a game disk and a save data disk;
a game console that is configured to execute video games, the streaming server providing an interface for a remote client device to interface with the game console and request that games be played, the game console and the streaming server being co-located in a first data center;
a storage server connected to the streaming server over a network connection, the storage server storing game disks that represent game logic for each of the video games;
a save data server located in a second data center for storing save data as save data disks separately from said game disks;
the streaming server being configured to retrieve save data from the save data server and cache the retrieved save data to the save data disk of the game console, the retrieving of the save data from the save data server being triggered automatically in response to the streaming server detecting that the game console has initiated a gaming session on the cloud gaming system and before receiving selection from the remote client to cause loading of the game logic for the video game;
wherein the save data that is retrieved and cached to the save data disk of the game console is predicted to have a likelihood of being used for resuming play of a specific video game associated with a user account, the save data including a current state of game play that represents activity performed during play of the game, and said save data is used to render the current state of game play of the game after the game logic for the game is loaded for the initiated gaming session, the user account being used to access the game console via the streaming server by the remote client device, the streaming server is configured to stream video frames during play of the game to the remote client without sending game logic or save data to the remote client.

11. The cloud gaming system of claim 10, wherein the game console is a cloud game console managed by the cloud gaming system.

12. The cloud gaming system of claim 10, further comprising,
data selection logic for identifying save data that is to be retrieved.

13. The cloud gaming system of claim 12, wherein the data selection logic selects different save data based on a user historical game use or game patterns.

14. A cloud gaming system, comprising,
a game console that is configured to execute video games, game console providing an interface for a remote client device to interface with the game console and request that games be played by streaming video frames to the remote client device, the game console being located in a first data center;
a storage server connected to the game console over a network connection in the first data center;
a save data server located in a second data center;
data selection logic of the game console, the data selection logic is configured to retrieve save data from the save data server and cache the save data to a save data disk of the game console;
wherein the data selection logic is configured to automatically retrieve the save data from the second data center to the first data center upon detecting a session initiation for a user account used via the remote client device, the save data including a current state of game play that represents activity performed during play of a game, and said save data is used to render the current state of game play after game logic of the game is loaded for the session initiation;
wherein the data selection logic is configured to retrieve, for specific games, the save data that is predicted to have a likelihood of being used during the session, the likelihood of being used is determined based on historical game play as associated with the user account;
wherein the game console is a cloud game console managed by the cloud gaming system for streaming said video frames without sending game logic or save data to the remote client.

15. The cloud gaming system of claim 14, wherein the data selection logic selects different save data based on game use or game use patterns associated with the user account or user accounts of other users.

16. The cloud gaming system of claim 14, wherein caching the save data includes filling the save data disk with blocks of data.

17. The cloud gaming system of claim 16, wherein filling the save disk data occurs during game startup.

* * * * *